Sept. 14, 1965  L. N. PLISK  3,205,579

DEMOUNTABLE GUN TELESCOPE MOUNTING

Filed Nov. 4, 1963  2 Sheets-Sheet 1

LEONARD N. PLISK
INVENTOR.

BY Frank C. Parker

ATTORNEY

Sept. 14, 1965   L. N. PLISK   3,205,579
DEMOUNTABLE GUN TELESCOPE MOUNTING
Filed Nov. 4, 1963   2 Sheets-Sheet 2

LEONARD N. PLISK
INVENTOR.

BY *Frank C. Parker*

ATTORNEY

United States Patent Office 3,205,579
Patented Sept. 14, 1965

3,205,579
DEMOUNTABLE GUN TELESCOPE MOUNTING
Leonard N. Plisk, Hilton, N.Y., assignor to Bausch &
Lomb Incorporated, Rochester, N.Y., a corporation of
New York
Filed Nov. 4, 1963, Ser. No. 321,049
4 Claims. (Cl. 33—50)

The present invention relates to a quick demountable type of gun telescope mounting and more particularly it relates to improvements in the clamping mechanism therefor.

Due to the severe stresses which a gun telescope mounting must transmit during firing of the gun or because of careless use, the alignment of the sighting telescope is often difficult to maintain and presents a considerable problem. The problem involves two kinds of motion of the telescope; one motion is displacement along the telescope axis and the other is lateral or angular motion about that axis.

It is an object of the present invention to provide a gun sighting telescope mounting which holds the telescope somewhat yieldably but reliably against a seating surface or surfaces which are attached to the gun at all times, the angular position of the telescope on said seating surfaces remaining precisely erect throughout all conditions of use.

A further object is to provide such a device having means for automatically reestablishing the erect angular position of the telescope after every occurrence of angular displacement thereof.

A still further object is to provide such a device which is sturdy enough to withstand rough use of accidental jarring as well as the percussive setback forces delivered by heavy caliber guns.

Further objects and advantages of this invention will be apparent from a study of the specification herebelow taken together with the accompanying drawings, wherein.

Figure 1:
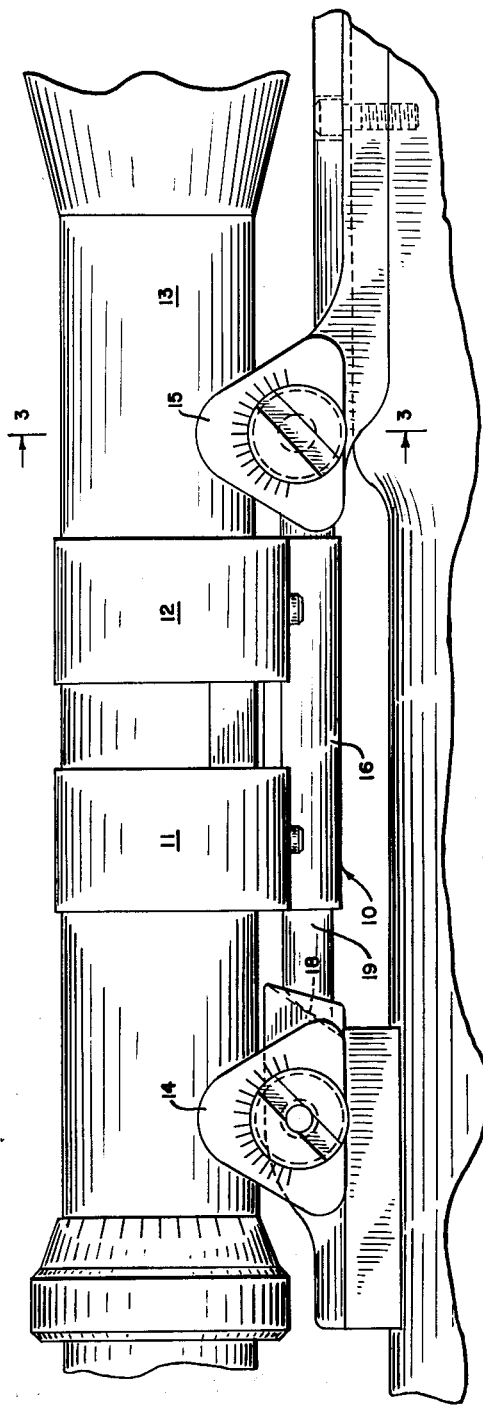
FIG. 1 is a side elevational view of a gun sighting telescope mounting incorporating said invention.
Figure 2:
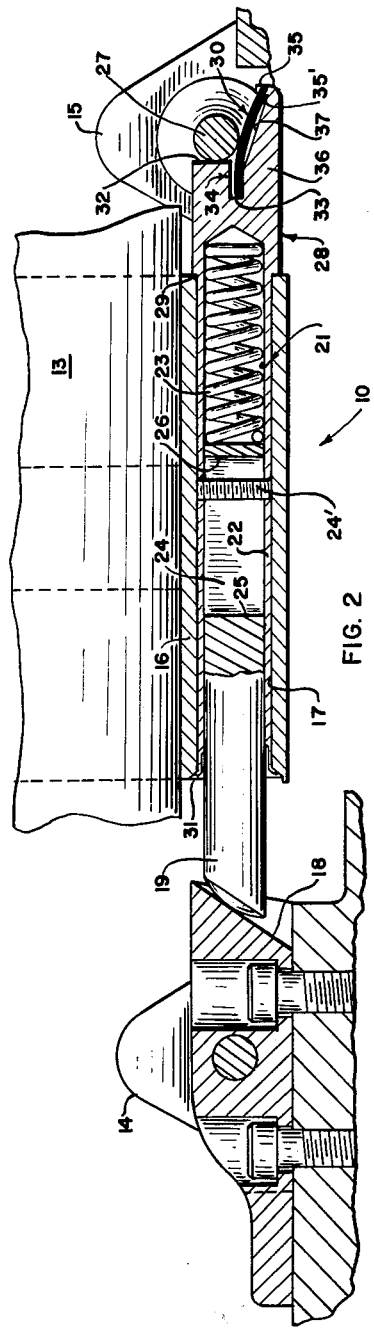
FIG. 2 is a midsectional view of said gun telescope mounting mechanism showing the telescope and gun parts partly broken away.

The invention here presented is a gun telescope mounting mechanism which is generally indicated by the numeral 10 in FIG. 2, said mechanism being solidly fixed in any suitable manner such as the clamp rings 11 and 12 to a gun telescope 13. The telescope 13 rests on a rear bracket 14 and a front bracket 15 which are fixed to a gun barrel in any preferred manner and is forcibly held thereon by the mechanism to be described hereinafter.

The aforesaid mounting mechanism 10 consists basically of an anchor bar 16 which is attached solidly to the clamp rings 11 and 12 in any preferred manner, and said bar is bored in a direction lengthwise of the telescope to form an opening having a cylindrical wall 17.

In order to releasably hold the telescope 13 on the brackets 14 and 15 the rear bracket 14, which may be suitably constructed for elevating the telescope, is provided with an undercut inclined anchor surface 18 on its front side. Against the undercut anchor surface 18 is forced a horizontal plunger 19 which is slidably fitted to the interior surface 21 of a tubular member 22, the inner bore of which is closed at its forward end. The plunger 19 is forced against the inclined anchor surface 18 by a stiff expansion spring 23 which is seated between the end of the plunger 19 and the closed end of said bore. Means are provided for limiting the travel of the plunger 19 comprising an open longitudinal slot 24 formed in the plunger 19 near its inner end, said slot being traversed by a screw 24' which is threaded through the walls of the tubular member 22 and extends through the longitudinal slot 24. Said screw 24' is engageable with a rear stop surface 25 on plunger 19 when the plunger moves toward the front and with a front stop surface 26 when the plunger is moved rearwardly.

Figure 3:
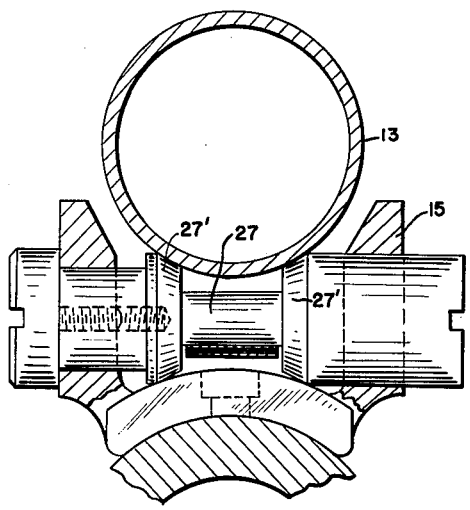
FIG. 3 is a sectional view taken on the line 3—3 of FIG. 1.
Figure 4:
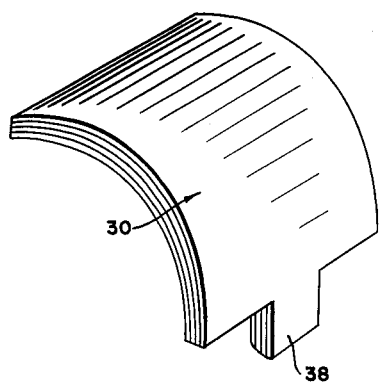
FIG. 4 is a perspective view of one of the operating parts of the invention.

In common with the prior art, the front bracket 15 is a part of a windage adjustment for the sighting telescope 13 characterized by a rod-like anchor member 27 against which the fore part of said mounting mechanism is anchored. Said anchor member 27 is enlarged at its ends as shown in FIG. 3 to form tapered twin seats 27' and said ends are threaded into the front bracket 15 in a well-known manner to provide axial windage adjustments therefor.

According to this invention, a head 28 is formed on the front end of the tubular member 21, the transverse dimensions thereof being somewhat larger than the outer diameter of the tubular part so as to provide a suitable locating shoulder 29 which lies in contact with the front end of the anchor bar 16. In order to retain the tubular member 22 in the anchor bar, the rear end thereof is riveted over the anchor bar as shown at 31 in FIG. 2. On the upper front part of the head 28 is formed parallel to the abutment member 27 a vertical and lateral abutment surface 32 which is intended to establish the normal forward location of the telescope 13 and serves also to transmit the heavy percussive forces of gun fire back to the telescope.

The principal feature of this invention concerns the mechanism whereby the telescope is resiliently biased against the telescope seating surfaces 27' on the front bracket 15 in such a manner that the clamping force is unvarying in its holding effect in spite of the use of wide manufacturing tolerances in the component adjacent parts of the telescope mounting mechanism. The mounting mechanism 10 is also so constructed and arranged advantageously to prevent rocking or angular displacement of the telescope 13 while resting on said seating surfaces 27' in spite of the repeated mountings and demountings of the instrument.

All of the above effects are realized by providing a laminated flat spring 30 which is curved from end to end lengthwise and is seated under spring stress at the rear end against a spring abutment surface 33 which forms the bottom of a longitudinal groove 34, said groove 34 being formed crosswise in the head 28. A forwardly projecting wedge-shaped jaw 36 is formed on the front of the head 28, the top surface 37 of which is downwardly inclined. On the foremost edge of the jaw 36, an upstanding flange 35 is formed which provides a spring abutment shoulder 35' along the rear side thereof. It will be observed by reference to FIG. 2 that the spring 30 is arched upwardly away from said top surface 37 of the jaw 36 sufficiently so that sudden unseating forces applied to the telescope accidentally or otherwise will merely compress the spring slightly until the spring meets the jaw surface 37 which then constitutes a solid stop.

Figure 5:
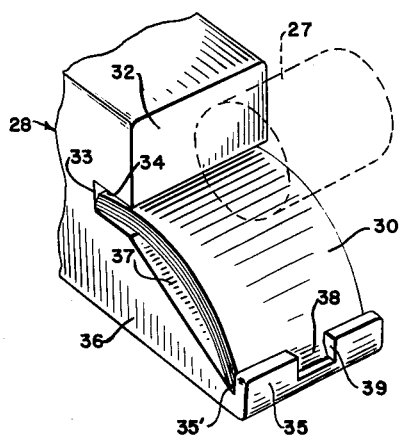
FIG. 5 is a perspective view partly broken away of a subassembly of parts including that part shown in FIG. 4.

As best shown in FIG. 5, the spring 30 is prevented from lateral displacement by providing a tongue 38 on the lower end thereof which engages a notch 39 into which the tongue 38 is fitted. Referring to FIG. 2 it will be noted that the entire active area of the spring 30 is inclined to some degree with respect to the horizontal axis of the tubular member 21 so as to provide the necessary spring deflection when clamping the telescope 13 onto the bracket 15.

Furthermore, still another important feature resides in the fact that the spring 30 is constructed wide enough to act as a straightening or erecting member when in contact with the lower side of the abutment member 27. In case the telescope is accidentally struck or pressed laterally of the gun in a sidewise direction, the telescope tends to tip or roll out of proper alignment with the gun and this tendency is effectively prohibited and corrected by momentarily building up excess pressure at one side of the flat spring 30 more than the pressure on the opposite side so as to force the telescope back to erect position.

With regard to the structure of the laminated spring 30, all of the laminations are similar and are preferably left mechanically free of each other although it may be desirable to mechanically bind the rear edge of the spring together as a solid edge for convenience in handling. In any case, the spring 30 is made thick enough to have sufficient power to accomplish the above-described erecting or straightening effect as well as the clamping effect and the effective force may be varied somewhat by varying the number of laminations. According to good mechanical principles, the spring 30 is so constructed of laminations, each having a low bending moment, that the spring is flexible enough to deflect in a proper manner to accomplish the above-described effects and yet the total bending moment imparted by all the laminations together is amply large to hold the telescope 13 solidly on its seating surfaces 27' during all conditions of use.

Although only certain mechanisms and forms thereof have been shown and described in detail, it will be understood that other forms are possible and substitutions may be made therein without departing from the spirit of the invention as defined in the claims here appended.

I claim:

1. In a demountable gun telescope mounting comprising a front and a rear mounting bracket whereon said telescope rests, said mounting having an elongated anchor bar secured longitudinally along said telescope and having an opening in which an elongated tubular member is fixed, an enlarged head formed on the forward end of said member, means for demountably holding the telescope on said front and rear brackets, said means including a lock pin fitted to slide in said tubular member and a compression spring operatively arranged with respect to said pin to force said head towards said front bracket, said head having a vertical abutment surface formed crosswise on the fore part thereof which abuts against an elongated anchor member fixed in said front bracket parallel to said abutment surface so as to locate the telescope, the improvement consisting of a flat retainer spring which is anchored in said head in a position to bear yieldably against the under part of said anchor member opposite to the telescope to force the telescope against the front bracket, said spring being inclined relative to the axis of said tubular member in such an operative manner that the telescope is increasingly biased against the front bracket as the anchor member is being advanced along the flat spring toward said abutment surface during assembly.

2. In a demountable gun telescope mounting comprising a front and a rear mounting bracket whereon said telescope rests, said mounting having an elongated anchor bar secured longitudinally along said telescope and having an opening in which an elongated tubular member is fixed therein, an enlarged head of greater width than said member formed on the forward end of said member, means for demountably holding the telescope on said front and rear brackets, said means including a lock pin fitted to slide in said tubular member and a compression spring operatively arranged with respect to said pin to force said head against said front bracket, said head having a vertical abutment surface formed crosswise on the fore part thereof which abuts against an elongated anchor member fixed in said front bracket parallel to said abutment surface so as to locate the telescope, the improvement consisting of a jaw formed on said head and projecting forwardly of said abutment surface, said jaw having a top surface spaced beneath said anchor member, a spring retaining shoulder formed along the front edge of said jaw, a spring abutment surface connecting two parallel and spaced walls which form an axially directed slot in said head contiguous to the bottom edge of said first abutment surface, a flat spring having a width approximately equal to the width of said head, the spring being curved longitudinally from end to end and being generally inclined to the axis of said tubular member, said spring further being confined under stress at its ends between said spring abutment surface and spring retaining shoulder and being slightly spaced in its midsection from said jaw whereby the spring per se acts to force the telescope down against the front bracket reliably in a substantially constant erect position on the gun while permitting only a limited maximum flexure thereof to prevent said spring from taking a permanent set.

3. A demountable gun telescope mounting as set forth in claim 2 further characterized by a protuberant locating tongue formed on the front edge of said spring, and a pair of parallel walls which are spaced apart on opposite sides of a notch in said shoulder so as to fit the sides of said tongue and prevent lateral displacement thereof.

4. A demountable gun telescope mounting according to claim 3, said flat spring being composed of a plurality of similar separate laminations formed of a spring material whereby the range of flexibility thereof is increased.

No references cited.

ISAAC LISANN, *Primary Examiner.*